(12) United States Patent
Zhang et al.

(10) Patent No.: US 9,788,300 B2
(45) Date of Patent: Oct. 10, 2017

(54) PAGING OPTIMIZATION FOR NARROW BAND INTERNET OF THINGS (NB-IOT)

(71) Applicant: NOKIA TECHNOLOGIES OY, Espoo (FI)

(72) Inventors: Yanji Zhang, Beijing (CN); Jussi-Pekka Koskinen, Oulu (FI); Rapeepat Ratasuk, Hoffman Estates, IL (US); Haitao Li, Beijing (CN); Yuantao Zhang, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/400,400

(22) Filed: Jan. 6, 2017

(65) Prior Publication Data

US 2017/0201963 A1 Jul. 13, 2017

Related U.S. Application Data

(60) Provisional application No. 62/276,538, filed on Jan. 8, 2016.

(51) Int. Cl.
*H04W 68/00* (2009.01)
*H04W 68/02* (2009.01)
*H04W 76/04* (2009.01)
*H04W 88/02* (2009.01)
*H04W 84/04* (2009.01)

(52) U.S. Cl.
CPC ......... *H04W 68/02* (2013.01); *H04W 76/048* (2013.01); *H04W 84/042* (2013.01); *H04W 88/02* (2013.01)

(58) Field of Classification Search
CPC ..................................................... H04W 68/02
USPC ........................................................ 455/458
See application file for complete search history.

(56) References Cited

U.S. PATENT DOCUMENTS

| | | | |
|---|---|---|---|
| 9,667,386 B2 * | 5/2017 | Li | H04L 1/08 |
| 9,668,236 B2 * | 5/2017 | Ryu | H04W 68/02 |
| 2015/0131579 A1 * | 5/2015 | Li | H04L 1/08 370/329 |
| 2015/0173122 A1 * | 6/2015 | Schliwa-Bertling | H04W 76/048 370/311 |
| 2015/0327032 A1 * | 11/2015 | Hedman | H04W 76/046 370/329 |
| 2016/0044578 A1 * | 2/2016 | Vajapeyam | H04W 52/0216 370/252 |
| 2016/0205661 A1 * | 7/2016 | Ryu | H04W 36/30 455/458 |
| 2016/0234804 A1 * | 8/2016 | Hu | H04W 68/02 |
| 2016/0286385 A1 * | 9/2016 | Ryu | H04W 68/02 |

(Continued)

*Primary Examiner* — Charles Shedrick
(74) *Attorney, Agent, or Firm* — Squire Patton Boggs (US) LLP

(57) ABSTRACT

Systems, methods, apparatuses, and computer program products for narrow band internet of things (NB-IoT) paging optimization are provided. One method includes, when extended discontinuous reception (eDRX) is not configured for a user equipment (UE), applying a maximum repetition number of each coverage enhancement (CE) mode for paging transmission and associating a different repetition number with each paging occasion (PO). When extended discontinuous reception (eDRX) is configured for the user equipment, the method includes associating each paging occasion (PO) with a different repetition number.

15 Claims, 5 Drawing Sheets

(56) References Cited

U.S. PATENT DOCUMENTS

2017/0019878 A1* 1/2017 Hu .................. H04W 68/02
2017/0064670 A1* 3/2017 Shen ............... H04W 68/005
2017/0127381 A1* 5/2017 Yavus .............. H04W 68/02

* cited by examiner

PAGING OPTIMIZATION FOR NARROW BAND INTERNET OF THINGS (NB-IOT)

CROSS-REFERENCE TO RELATED APPLICATIONS

This application claims priority from U.S. Provisional Application No. 62/276,538, filed on Jan. 8, 2016. The entire contents of this earlier filed application are hereby incorporated by reference in their entirety.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA). In particular, some embodiments may relate to narrow band internet of things (NB-IoT) paging optimization.

Description of the Related Art

Universal Mobile Telecommunications System (UNITS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided in the evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UNITS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

5G is the new generation of radio systems and network architecture delivering extreme broadband and ultra-robust, low latency connectivity and massive networking for the Internet of Things (IoT) to enable the programmable world, which can transform individual lives, the economy and society as a whole. Narrowband IoT-LTE (NB-IoT) is envisioned to operate on 180/200 kHz channel. The deployment of NB-IoT may be inband LTE, a guard band to LTE, UNITS or other system as well as stand alone on a specific carrier.

SUMMARY

One embodiment is directed to a method. The method may include, when extended discontinuous reception (eDRX) is not configured for a user equipment (UE), applying a maximum repetition number of each coverage enhancement (CE) mode for paging transmission and associating a different repetition number with each paging occasion (PO). The method may also include, when extended discontinuous reception (eDRX) is configured for the user equipment, associating each paging occasion (PO) with a different repetition number.

Another embodiment is directed to an apparatus, which may include at least one processor and at least one memory including computer program code. When extended discontinuous reception (eDRX) is not configured for a user equipment (UE), the at least one memory and the computer program code are configured, with the at least one processor, to cause the apparatus at least to apply a maximum repetition number of each coverage enhancement (CE) mode for paging transmission and associate a different repetition number with each paging occasion (PO). When extended discontinuous reception (eDRX) is configured for the user equipment, the at least one memory and the computer program code are configured, with the at least one processor, to cause the apparatus at least to associate each paging occasion (PO) with a different repetition number.

Another embodiment is directed to a computer program embodied on a non-transitory computer readable medium. The computer program, when executed by a processor, is configured to control the processor to perform a process, which may include, when extended discontinuous reception (eDRX) is not configured for a user equipment (UE), applying a maximum repetition number of each coverage enhancement (CE) mode for paging transmission and associating a different repetition number with each paging occasion (PO). When extended discontinuous reception (eDRX) is configured for the user equipment, the process may include associating each paging occasion (PO) with a different repetition number.

Another embodiment is directed to a method. The method may include, when eDRX is not configured for a user equipment (UE), applying the maximum repetition number of each coverage enhancement (CE) mode for paging transmission and selecting the paging occasion (PO) for monitoring a paging message according to a current coverage enhancement (CE) mode of the user equipment (UE). When eDRX is configured for the user equipment (UE), the method may include that a different repetition number is applied at each paging occasion (PO) within the paging transmission window (PTW), and selecting the paging occasion (PO) for monitoring a paging message within the paging transmission window (PTW) according to the current coverage enhancement (CE) mode of the user equipment (UE), or receiving information on which repetitions the user equipment (UE) should listen to within the paging transmission window (PTW) or which repetition factor the user equipment (UE) should use for determining which paging occasions (POs) the user equipment (UE) will monitor.

Another embodiment is directed to an apparatus, which may include at least one processor and at least one memory including computer program code. When extended discontinuous reception (eDRX) is not configured for the apparatus, the at least one memory and the computer program code are configured, with the at least one processor, to cause the apparatus at least to apply the maximum repetition number of each coverage enhancement (CE) mode for paging transmission and selecting the paging occasion (PO) for monitoring a paging message according to a current coverage enhancement (CE) mode of the apparatus. When eDRX is configured for the apparatus, a different repetition number is applied at each paging occasion (PO) within the paging transmission window (PTW) and the at least one memory and the computer program code are configured, with the at least one processor, to cause the apparatus at least to select the paging occasion (PO) for monitoring a paging message within the paging transmission window (PTW) according to the current coverage enhancement (CE) mode of the apparatus, or receive information on which repetitions the apparatus should listen to within the paging transmission window (PTW) or which repetition factor the apparatus should use for determining which paging occasions (POs) the apparatus will monitor.

Another embodiment is directed to a computer program embodied on a non-transitory computer readable medium. The computer program, when executed by a processor, is configured to control the processor to perform a process, which may include, when extended discontinuous reception (eDRX) is not configured for a user equipment (UE), applying the maximum repetition number of each coverage enhancement (CE) mode for paging transmission and selecting the paging occasion (PO) for monitoring a paging message according to a current coverage enhancement (CE) mode of the user equipment (UE). When eDRX is configured for the user equipment (UE), the process may include that a different repetition number is applied at each paging occasion (PO) within the paging transmission window (PTW), and selecting the paging occasion (PO) for monitoring a paging message within the paging transmission window (PTW) according to the current coverage enhancement (CE) mode of the user equipment (UE), or receiving information on which repetitions the user equipment (UE) should listen to within the paging transmission window (PTW) or which repetition factor the user equipment (UE) should use for determining which paging occasions (POs) the user equipment (UE) will monitor.

BRIEF DESCRIPTION OF THE DRAWINGS

For proper understanding of the invention, reference should be made to the accompanying drawings, wherein.

DETAILED DESCRIPTION

Figure 1:
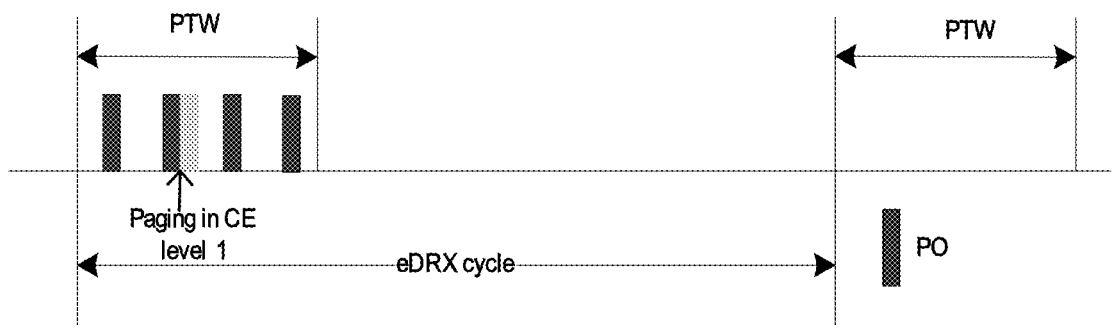
FIG. 1 illustrates a diagram of a situation in which retransmitted paging is sent within the next PTW.

It will be readily understood that the components of the invention, as generally described and illustrated in the figures herein, may be arranged and designed in a wide variety of different configurations. Thus, the following detailed description of embodiments of systems, methods, apparatuses, and computer program products for narrow band internet of things (NB-IoT) paging optimization, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

3GPP has approved the Rel-13 work item on Narrow Band Internet of Things (NB-IoT) design. An objective of the NB-IoT work item is to specify a radio access for cellular internet of things, based to a great extent on a non-backward-compatible variant of E-UTRA, which addresses improved indoor coverage, support for massive number of low throughput devices, low delay sensitivity, ultra-low device cost, low device power consumption and optimized network architecture.

RAN2 has agreed to certain approaches regarding paging procedure for NB-IoT. It is assumed that different paging transmission repetitions are supported for different coverage level. A NB-IoT UE may determine the paging occasions to monitor paging messages by using UE ID and Frame Number. It is left for further study if other parameter(s) are also needed. RAN2 assumes that the core network (CN) node can provide information on the coverage level of the UE, the paging attempt number, and the last known Cell ID, to the radio access network (RAN) node in NB-IoT. It may also be assumed that NB-IOT may use the extended discontinuous reception (eDRX) system solution(s).

In NB-IOT, a system frame number (SFN)-based short DRX or long DRX (eDRX) with paging transmission window (PTW) may be used. NB-IOT supports a short DRX up to X seconds, where X may be selected to allow RAN repetitions between paging occasion (PO), and to allow CN to trigger retransmissions at PO's. A UE may monitor all its paging occasions (POs) in the PTW. PTW starts and PO may be calculated based on UE-ID. For short DRX individual paging cycle is not needed, and the defaultPagingCycle of the cell can be used. As specified for eDRX, it is assumed that the extended DRX cycle length and PTW size are negotiated between the UE and CN during ATTACH/tracking area update (TAU). RAN2 assumes that the CN sends the paging message to the eNodeB just before the PTW of the NB-IOT device.

As per RAN2 agreement, the intention is that paging for NB-IoT reuses schemes from enhanced machine type communication (eMTC) and eDRX. That is, the eNB may decide the repetition factor for paging based on the coverage enhancement (CE) level information and paging attempt count in a paging message. The UE may decode the potential paging based on its current CE level from each PO (within the PTW if eDRX is configured).

In addition, because of the limited 1 physical resource block (PRB), the Physical Downlink Control Channel (PD-CCH)-less scheduling might be beneficial to reduce the signaling overhead and potential power consumption in the UE. However, without downlink control information (DCI) indication, the UE has to blindly decode the physical downlink shared channel (PDSCH) transmission, it may not always apply the correct repetition number in case of the CE level change during idle mode.

For example, supposing that the CE level reported to a mobility management entity (MME) is level 1, the eNB may consider applying CE level 1 for paging the UE from the second PO within the PTW. However, if the UE is now working in CE level 2, it will fail to decode the paging. The MME may retransmit the paging in case there is no paging response from the UE; however, the retransmitted paging can only be scheduled by the eNB within the next PTW. Therefore, this will result in a significant paging delay considering the extended paging cycle. FIG. 1 illustrates an example of this situation.

The UE may try all the possible repetition numbers for decoding the paging message from the PO all the time, but this would increase the complexity of UE implementation and the UE power significantly depending on how many repetitions are configured for PDSCH transmission.

Embodiments of the invention provide enhancements to the paging procedure for NB-IoT devices. According to an embodiment, when eDRX is configured for the UE, a different repetition number is applied at each PO within the PTW, and the pattern may be derived from the CE level (mode) and the number of POs within the PTW. For example, the CE level may be reported to the MME, selected by the UE, or estimated by the UE based on the radio measurement. To improve the reliability of paging reception in the UE, the later that the PO is in the PTW, the higher repetition number is applied. In an embodiment, how the repetition number is associated with each PO may be preconfigured by the eNB via system information, predefined in the specification, or may use dedicated signaling. According to one embodiment, the UE may select the PO for monitoring a paging message within the PTW according to its current CE mode. Alternatively, the UE may be explicitly informed (via dedicated and/or broadcast signaling) of which repetitions the UE shall listen to within the PTW or which repetition factor the UE may use for determining which POs the UE should monitor.

When eDRX is not configured for the UE, in one embodiment, the maximum repetition number from a set of repetitions associated with each CE mode is applied for paging transmission. A different repetition number may be associated with each PO, which could be preconfigured by the eNB via system information, predefined in the specification, or use dedicated signalling. In another embodiment, the UE may select the PO for monitoring a paging message according to its current CE mode.

eDRX Operation

According to the eDRX mechanism, the UE monitors all the POs within the window. Embodiments aim to reduce the blind decoding attempt and know exact repetition factor applied for the PO. According to an embodiment, a specific repetition number may be applied for each PO within the PTW.

The repetition number may be determined according to certain parameters as discussed in the following. In an embodiment, the repetition number may be determined according to the CE mode/level reported to the MME when the UE transits to IDLE mode. In addition, according to one embodiment, the CE mode/level may be selected by the UE; for example, the CE mode/level may be selected based on the previous successful usage of some certain level. Additionally or alternatively, the CE mode/level may be selected based on the UE radio measurement.

Further, in certain embodiments, the repetition number may be determined according to the number of POs within the PTW. In another embodiment, the repetition number may be determined according to the sets of repetitions for each coverage mode supported by the eNB.

In an embodiment, supposing that C is the set of PDSCH repetition number applied for paging and C={R1, R2, R3, ... Rn}, where Rn means the repetition number, C may be derived from the CE mode of the UE when it leaves connected mode.

As one example, if UE worked in CE mode A when leaving connected mode, then: C=A; If UE worked in CE mode B when leaving connected mode then: C=B; Where A is the set of PDSCH repetition numbers for CE mode A, B is the set of PDSCH repetition numbers for CE mode B. As another example, if UE worked in CE mode A when leaving connected mode, it may go to CE mode B in idle mode which may need more repetitions. It may be safe to include the configure repetitions of mode B, i.e., C=A∪B. While if it left connected mode with mode B which has already sufficient repetitions configured, only B is included, i.e., C=B. In theory, C may be the combination of sets from the current CE mode until the highest CE mode, if there are two or more CE modes for NB IoT operation.

In an embodiment, index of repetition in C for a specific PO could be determined by the equation below:

$$I_{repetition}=I_{po} \cdot [(N_{repetition}-1)/(N_{po}-1)](N_{repetition}-1)\%(N_{po}-1),$$

where $N_{po}$ is the number of POs within the PTW, $N_{repetition}$ is the number of repetitions within C, $I_{po}$ is the index of the PO inside PTW, and $I_{repetition}$ is the index of the repetitions within the repetition set.

Figure 2:
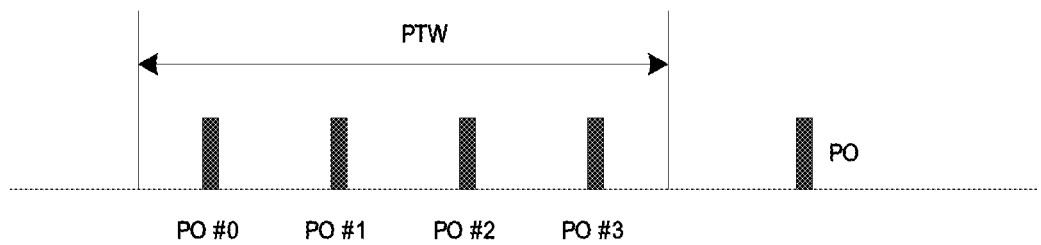
FIG. 2 illustrates an example of paging with eDRX, according to an embodiment.

FIG. 2 illustrates an example of paging with eDRX, according to an embodiment. In this example, there are 4 POs within the PTW (Npo=4), the CE mode of UE stored in eNB is A (the CE mode of UE before leaving Connected mode), which is associated with a set of repetitions of {1,4,8,16}, while CE mode B is associated with a set of repetitions of {4,8,16,32,64,128,192,256}. Then, C={1,4,8,16,32,64,128,192,256}, Nrepetition=9, and $$I_{repetition}=I_{po} \cdot (N_{repetition}-1)/(N_{po}-1)+(N_{repetition}-1)\%(N_{po}-1)=I_{po}\cdot(8/3)+(8\%3)=2 \cdot I_{po}+2$$

Table 1 illustrates the repetition number that may be applied for each PO within PTW.

TABLE 1

| PO | Index of repetition in C | Repetition number |
|---|---|---|
| #0 | 2 | 8 |
| #1 | 4 | 32 |
| #2 | 6 | 128 |
| #3 | 8 | 256 |

In an embodiment, the eNB may decide how many and from which PO the paging messages are sent within PTW, which is similar to how the eNB behaves for Rel-13 eDRX operation, but it has to repeat the paging message with the derived repetition number from the specific PO, as illustrated in Table 1.

According to an embodiment, the UE may detect the paging message from the PO(s) according to the desired repetition number based on its current CE mode. For example, if the UE is now working in CE mode B and 6 repetitions are expected, the UE may skip PO #0 and PO #1 and start decoding paging from PO #2 within the window.

Non-eDRX Operation

When the eDRX is not configured and the normal legacy DRX cycle is applied, the maximum repetition number from a set of repetitions configured for each CE mode may be applied for paging transmission. In an embodiment, the CE mode for the PO could be derived from the following equation:

$$I_{ce\_mode} = (SFN/T) \bmod N_{ce\_mode},$$

Where Ice_mode is index of the CE mode supported by the eNB, Nce_mode is the maximum number of the CE mode supported by the eNB, SFN is the SFN of the Paging Frame (PF) where PO occurs, and T is DRX cycle of the UE. T may be determined by the shortest of the UE specific DRX value, if allocated by upper layers, and a default DRX value broadcast in system information. If UE specific DRX is not configured by upper layers, the default value is applied.

In an embodiment, the eNB may repeat the paging message with the maximum repetition number of the derived CE mode for each PO based on the above equation ($I_{ce\_mode}$=(SFN/T) mod $N_{ce\_mode}$). While the UE may only need to detect the paging from the PO associated with the repetition number which satisfies its current coverage situation.

Figure 3:
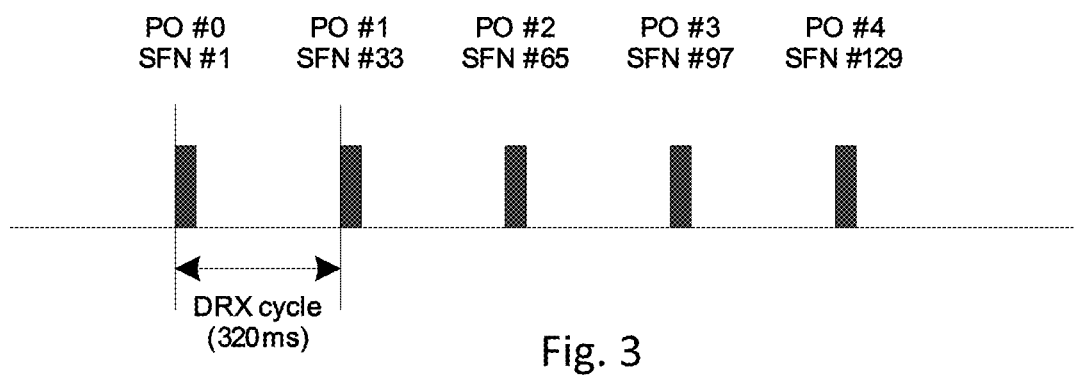
FIG. 3 illustrates an example of paging with legacy normal DRX, according to an embodiment.

FIG. 3 illustrates an example of paging with legacy normal DRX. For example, there are two CE modes, mode A and mode B ($N_{ce\_mode}$=2), CE mode A is associated with a set of repetitions of {1,4,8,16}, the maximum repetitions for CE mode A is 16, while CE mode B is associated with a set of repetitions of {4,8,16,32,64,128,192,256} and the maximum repetitions for CE mode B is 256. The UE may be configured with paging cycle of 320 ms, the SFN of the PFs are SFN #1, SFN #33, SFN #65 . . . , etc. Then, $I_{ce\_mode}$=(SFN/T) mod $N_{ce\_mode}$=(SFN/32) mod 2.

Table 2 below illustrates examples of repetition number associated with each PO in case of normal legacy DRX cycle. According to Table 2, the paging message is repeated 16 times from PO #0 (SFN #1), PO #2 (SFN #65) and PO #4 (SFN #129) . . . , it is repeated 256 times from PO #1 (SFN #33) and PO #3 (SFN #97). If the UE is now working in CE mode B it will monitor paging from PO #1 and PO #3 . . . , which could provide sufficient repetitions of paging.

TABLE 2

| PO | Index of CE mode | Repetition number |
|---|---|---|
| #0 | 0 – CE mode A | 16 |
| #1 | (33/32) mod 2 = 1 – CE mode B | 256 |
| #2 | (65/32) mod 2 = 0 – CE mode A | 16 |
| #3 | (97/32) mod 2 = 1 – CE mode B | 256 |
| #4 | (129/32) mod 2 = 0 – CE mode A | 16 |

Figure 4A:
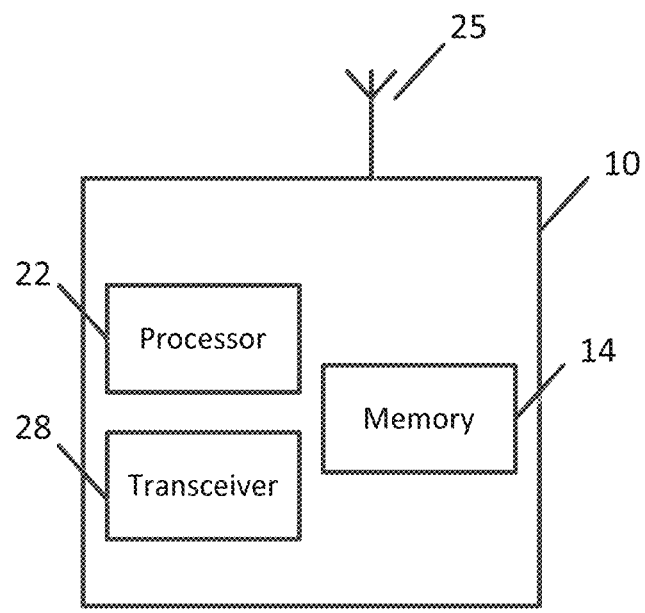
FIG. 4a illustrates a block diagram of an apparatus, according to one embodiment.

FIG. 4a illustrates an example of an apparatus 10 according to an embodiment. In an embodiment, apparatus 10 may be a node, host, or server in a communications network or serving such a network. For example, in certain embodiments, apparatus 10 may be a network node or access node for a radio access network, such as a base station, e.g., NodeB (NB) in UMTS or eNodeB (eNB) in LTE or LTE-A, or an access node in a 5G system. However, in other embodiments, apparatus 10 may be other components within a radio access network. It should be noted that one of ordinary skill in the art would understand that apparatus 10 may include components or features not shown in FIG. 4a.

As illustrated in FIG. 4a, apparatus 10 includes a processor 22 for processing information and executing instructions or operations. Processor 22 may be any type of general or specific purpose processor. While a single processor 22 is shown in FIG. 4a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station in UNITS or an eNB in LTE or LTE-A, or an access node in 5G, for example. According to certain embodiments, when eDRX is configured for a UE, apparatus 10 may be controlled by at least one memory 14 and at least one processor 22 to associate the PO with a different repetition number based on a predefined equation (e.g., $I_{repetition} = I_{po} \cdot [(N_{repetition}-1) \quad (N_{po}-1)]$ $(N_{repetition}-1) \% (N_{po}-1))$. In an embodiment, the repetition number may be derived from the CE level and/or from the number of POs within the PTW. According to one embodiment, the later that the PO is in the PTW, the higher the repetition number that is applied. In some embodiments, apparatus 10 may be controlled by at least one memory 14 and at least one processor 22 to pre-configure how the repetition number is associated with each PO, for example, via system information, via being predefined in the 3GPP specification, or via dedicated signaling. Optionally, according to one embodiment, apparatus 10 may also be controlled by at least one memory 14 and at least one processor 22 to inform (e.g., via dedicated and/or broadcast signaling) which repetitions the UE should listen to within the PTW or which repetition factor the UE should use for determining which POs the UE will monitor. In an embodiment, apparatus 10 may be controlled by at least one memory 14 and at least one processor 22 to apply a different repetition number at each PO within the PTW.

In another embodiment, when eDRX is not configured for a UE, apparatus 10 may be controlled by at least one memory 14 and at least one processor 22 to apply the maximum repetition number configured for each CE mode for paging transmission. In this embodiment, a different repetition number may be associated with each PO, and apparatus 10 may be controlled by at least one memory 14 and at least one processor 22 to associate a different repetition number with each PO.

Figure 4B:
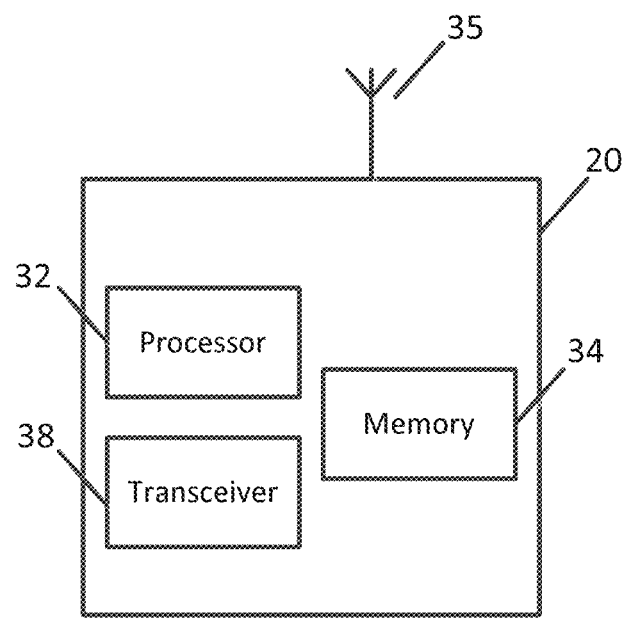
FIG. 4b illustrates a block diagram of an apparatus, according to another embodiment.

FIG. 4b illustrates an example of an apparatus 20 according to another embodiment. In an embodiment, apparatus 20 may be a node or element in a communications network or associated with such a network, such as a UE, mobile device, mobile unit, machine type UE or other device. For instance, in some embodiments, apparatus 20 may be UE in LTE or LTE-A. It should be noted that one of ordinary skill in the art would understand that apparatus 20 may include components or features not shown in FIG. 4b.

As illustrated in FIG. 4b, apparatus 20 includes a processor 32 for processing information and executing instructions or operations. Processor 32 may be any type of general or specific purpose processor. While a single processor 32 is shown in FIG. 4b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE in LTE or LTE-A. In one embodiment, when eDRX is configured for apparatus 20, a different repetition number is applied at each PO within the PTW, and apparatus 20 may be controlled by at least one memory 34 and at least one processor 32 to select the PO for monitoring a paging message within the PTW according to the current CE mode of apparatus 20. Alternatively, apparatus 20 may be controlled by at least one memory 34 and at least one processor 32 to receive (via dedicated and/or broadcast signaling) information on which repetitions apparatus 20 should listen to within the PTW or which repetition factor apparatus 20 should use for determining which POs apparatus 20 will monitor.

In another embodiment, when eDRX is not configured for apparatus 20, the maximum repetition number configured for each CE mode is applied for paging transmission, and apparatus 20 may be controlled by at least one memory 34 and at least one processor 32 to select the PO for monitoring a paging message according to a current CE mode of apparatus 20.

Figure 5A:
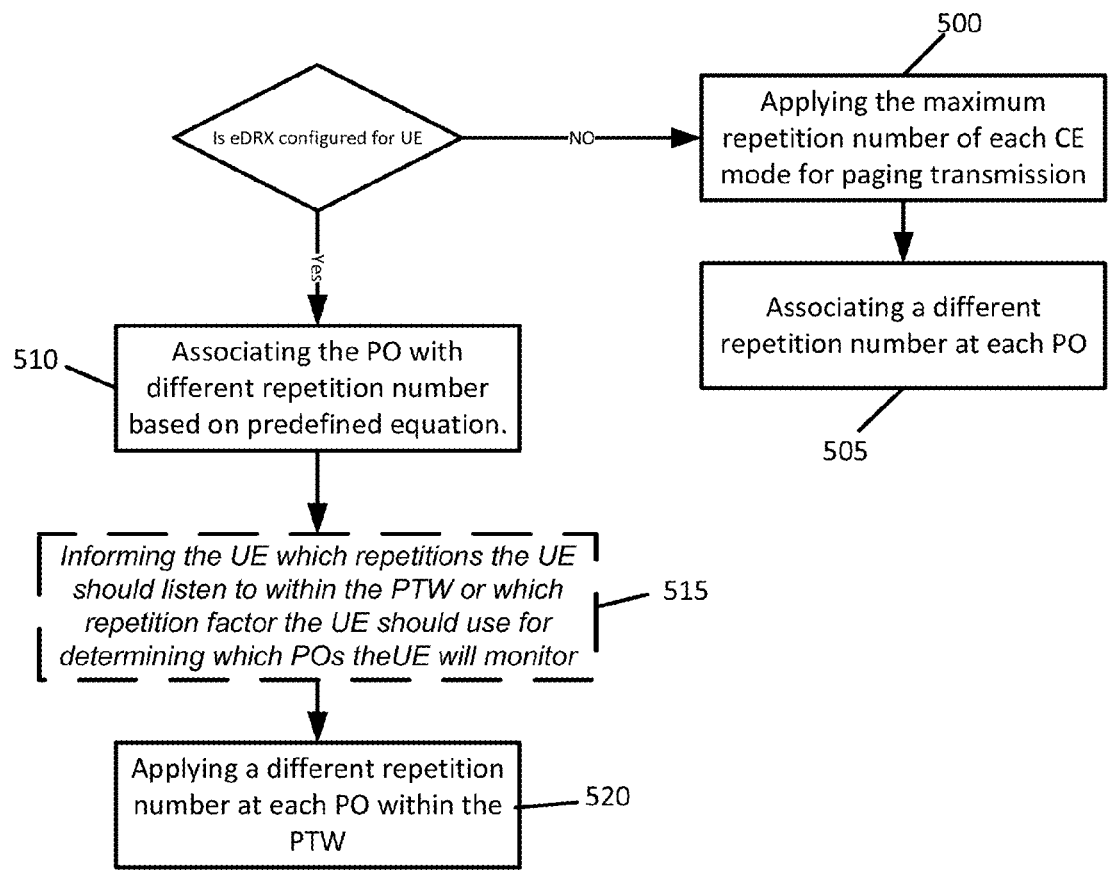
FIG. 5a illustrates an example flow diagram of a method, according to one embodiment.

FIG. 5a illustrates an example flow diagram of a method, according to one embodiment of the invention. In certain embodiments, the method of FIG. 5a may be performed by a network node, such as a base station or eNB. As illustrated in FIG. 5a, the method may include, at 500, when eDRX is not configured for a UE, applying the maximum repetition number of each CE mode for paging transmission. The method may then include, at 505, associating a different repetition number with each PO. When eDRX is configured for the UE, the method may include, at 510, associating the PO with a different repetition number based on a predefined equation (e.g., $I_{repetition} = I_{po} \cdot [(N_{repetition}-1) \ (N_{po}-1)] + (N_{repetition}-1) \% (N_{po}-1)$). In an embodiment, the repetition number may be derived from the CE level and/or from the number of POs within the PTW. According to one embodiment, the later that the PO is in the PTW, the higher the repetition number that is applied. In some embodiments, the method may include pre-configuring how the repetition number is associated with each PO, for example, via system information, via being predefined in the 3GPP specification, or via dedicated signaling. Optionally, according to one example embodiment, the method may include, at 515, informing the UE (e.g., via dedicated and/or broadcast signaling) which repetitions the UE should listen to within the PTW or which repetition factor the UE should use for determining which POs the UE will monitor. In an embodiment, the method may also include, at 520, applying a different repetition number at each PO within the PTW.

Figure 5B:
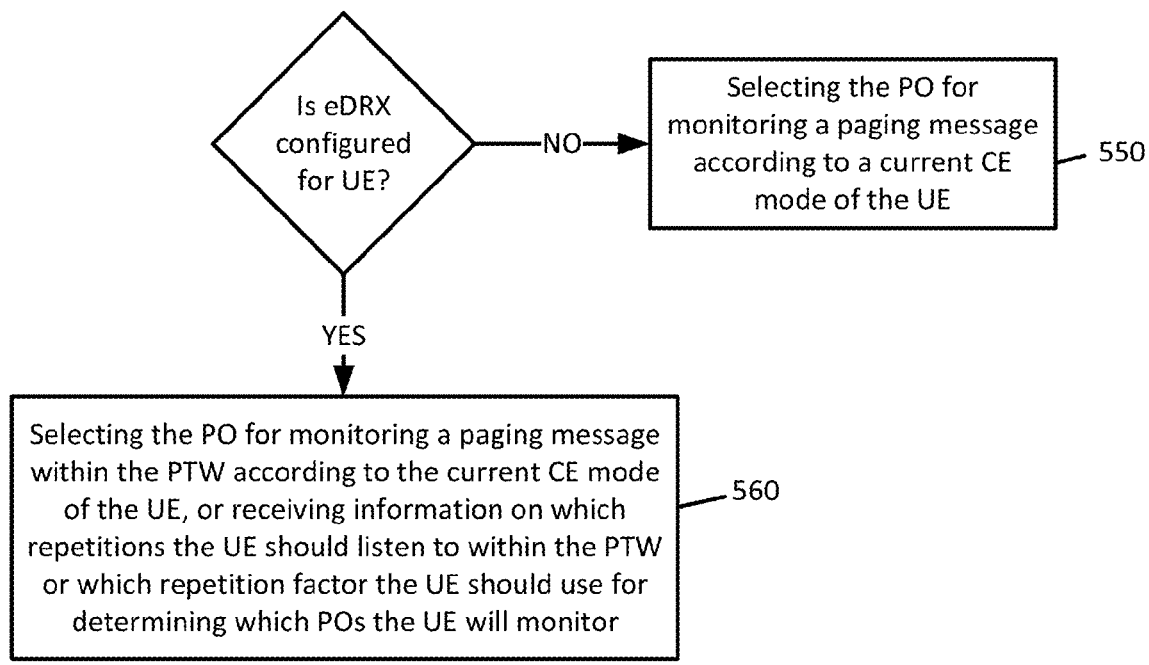
FIG. 5b illustrates an example flow diagram of a method, according to another embodiment.

FIG. 5b illustrates an example flow diagram of a method, according to another embodiment of the invention. In certain embodiments, the method of FIG. 5b may be performed by a device, such as a UE in LTE or LTE-A. As illustrated in FIG. 5b, when eDRX is not configured for the UE, applying the maximum repetition number of each CE mode for paging transmission, and the method may include, at 550, selecting the PO for monitoring a paging message according to a current CE mode of the UE. When eDRX is configured for the UE, a different repetition number is applied at each PO within the PTW, and the method may include, at 560, selecting the PO for monitoring a paging message within the PTW according to the current CE mode of the UE, or receiving (via dedicated and/or broadcast signaling) information on which repetitions the UE should listen to within the PTW or which repetition factor the UE should use for determining which POs the UE will monitor.

In some embodiments, the functionality of any of the methods described herein, such as those illustrated in FIGS. 5a and 5b discussed above, may be implemented by software and/or computer program code or portions of it stored in memory or other computer readable or tangible media, and executed by a processor. In some embodiments, the apparatuses described herein may be, included or be associated with at least one software application, module, unit or entity configured as arithmetic operation(s), or as a program or portions of it (including an added or updated software routine), executed by at least one operation processor.

Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments of the invention provide several advantages and technical improvements. As discussed herein, embodiments provide a method to derive the repetition factors applied for each PO (within the PTW if eDRX is configured). As a result, the repetition factor could be aligned between the UE and the network to increase the successful blind decoding of PDSCH for paging message, to ensure the reliable paging reception and avoid unnecessary paging delay with extremely long DRX cycle.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:
   when extended discontinuous reception (eDRX) is not configured for a user equipment (UE), applying a maximum repetition number of each coverage enhancement (CE) mode for paging transmission and associating a different repetition number with each paging occasion (PO); and
   when extended discontinuous reception (eDRX) is configured for the user equipment, associating each paging occasion (PO) with a different repetition number.

2. The method according to claim 1, wherein the repetition number is derived from at least one of the coverage enhancement (CE) level or a number of paging occasions (POs) within a paging transmission window (PTW).

3. The method according to claim 1, wherein the associating comprises associating said each paging occasion (PO) with a different repetition number based on a pre-defined formula as follows:

$$I_{repetition} = I_{po} \cdot [(N_{repetition}-1)/(N_{po}-1)] + (N_{repetition}-1)\% (N_{po}-1),$$

where $N_{po}$ is the number of POs within a paging transmission window (PTW), $N_{repetition}$ is the number of repetitions within C where C is the set of repetition number, $I_{po}$ is the index of the paging occasion (PO) inside the paging transmission window (PTW), and $I_{repetition}$ is the index of the repetitions within the repetition set.

4. The method according to claim 2, wherein, the later that a paging occasion (PO) is in the paging transmission window (PTW), the higher the repetition number that is applied for that paging occasion (PO).

5. The method according to claim 1, wherein the associating comprises pre-configuring how the repetition number is associated with each paging occasion (PO) by system information, by dedicated signaling, or by being predefined in a specification.

6. The method according to claim 2, further comprising applying a different repetition number at said each paging occasion (PO) within the paging transmission window (PTW).

7. The method according to claim 1, further comprising informing the user equipment (UE) which repetitions the user equipment (UE) should listen to within the paging transmission window (PTW) or which repetition factor the user equipment (UE) should use for determining which paging occasions (POs) the user equipment (UE) will monitor.

8. An apparatus, comprising:
at least one processor; and
at least one memory including computer program code;
the at least one memory and the computer program code are configured, with the at least one processor, to cause the apparatus at least to
when extended discontinuous reception (eDRX) is not configured for a user equipment (UE), apply a maximum repetition number of each coverage enhancement (CE) mode for paging transmission and associate a different repetition number with each paging occasion (PO); and
when extended discontinuous reception (eDRX) is configured for the user equipment, associate each paging occasion (PO) with a different repetition number.

9. The apparatus according to claim 8, wherein the repetition number is derived from at least one of the coverage enhancement (CE) level or a number of paging occasions (POs) within a paging transmission window (PTW).

10. The apparatus according to claim 8, wherein the at least one memory and the computer program code are further configured, with the at least one processor, to cause the apparatus at least to associate said each paging occasion (PO) with a different repetition number based on a pre-defined formula as follows:

$$I_{repetition} = I_{po} \cdot [(N_{repetition}-1)/(N_{po}-1)] + (N_{repetition}-1)\% (N_{po}-1),$$

where $N_{po}$ is the number of POs within a paging transmission window (PTW), $N_{repetition}$ is the number of repetitions within C where C is the set of repetition number, $I_{po}$ is the index of the paging occasion (PO) inside the paging transmission window (PTW), and $I_{repetition}$ is the index of the repetitions within the repetition set.

11. The apparatus according to claim 9, wherein, the later that a paging occasion (PO) is in the paging transmission window (PTW), the higher the repetition number that is applied for that paging occasion (PO).

12. The apparatus according to claim 8, wherein how the repetition number is associated with each paging occasion (PO) is pre-configured by system information, by dedicated signaling, or by being predefined in a specification.

13. The apparatus according to claim 9, wherein the at least one memory and the computer program code are further configured, with the at least one processor, to cause the apparatus at least to apply a different repetition number at said each paging occasion (PO) within the paging transmission window (PTW).

14. The apparatus according to claim 8, wherein the at least one memory and the computer program code are further configured, with the at least one processor, to cause the apparatus at least to inform the user equipment (UE) which repetitions the user equipment (UE) should listen to within the paging transmission window (PTW) or which repetition factor the user equipment (UE) should use for determining which paging occasions (POs) the user equipment (UE) will monitor.

15. A computer program embodied on a non-transitory computer readable medium, wherein the computer program, when executed by a processor, is configured to control the processor to perform a process, comprising:
when extended discontinuous reception (eDRX) is not configured for a user equipment (UE), applying a maximum repetition number of each coverage enhancement (CE) mode for paging transmission and associating a different repetition number with each paging occasion (PO); and
when extended discontinuous reception (eDRX) is configured for the user equipment, associating each paging occasion (PO) with a different repetition number.

* * * * *